H. W. QUIN.
Carriage Seats.

No. 146,278. Patented Jan. 6, 1874.

Witnesses.
A. Ruppert.
A. C. Cassell.

Inventor.
H. W. Quin
D. P. Holloway & Co
Atty.

UNITED STATES PATENT OFFICE.

HENRY W. QUIN, OF ANDERSON, INDIANA.

IMPROVEMENT IN CARRIAGE-SEATS.

Specification forming part of Letters Patent No. 146,278, dated January 6, 1874; application filed August 5, 1873.

*To all whom it may concern:*

Be it known that I, HENRY W. QUIN, of Anderson, in the county of Madison and State of Indiana, have invented a new and useful Improvement in Carriages; and I do hereby declare that the following is a full, clear, and exact description of the same, reference being had to the annexed drawings making part of this specification, in which—

Figure 1:
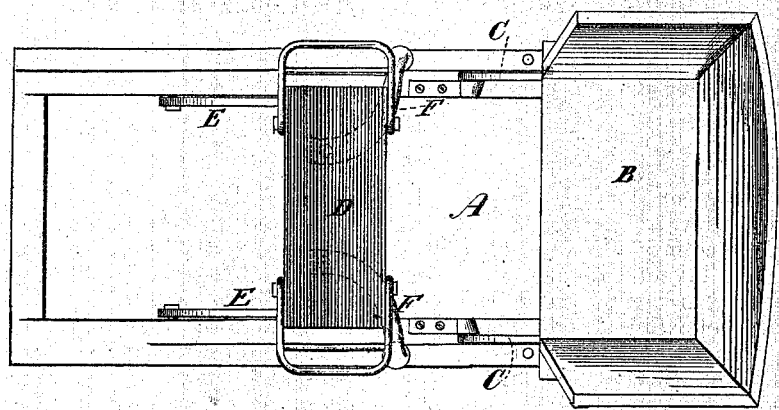
Figure 2:
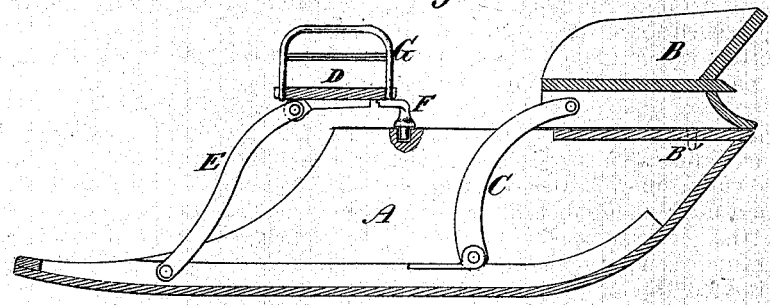
Figure 3:
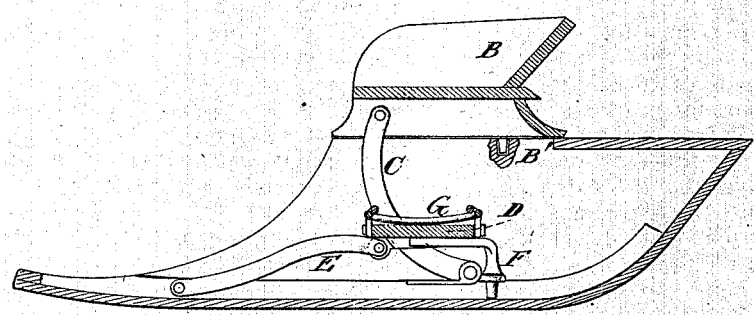
Figure 4:
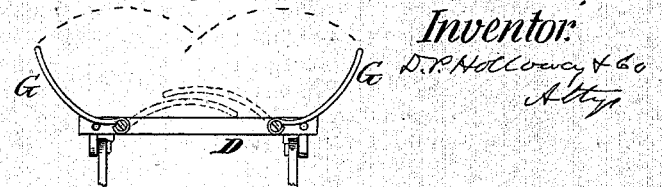

Figure 1 is a plan. Fig. 2 is a vertical longitudinal section, showing the carriage arranged for two seats. Fig. 3 is a similar section, showing it arranged for one seat; and Fig. 4 is a front elevation of the front seat.

The same letters are employed in the designation of the parts when appearing in different figures.

This invention relates to that class of carriages which are adjustable as to their seats, commonly known as jump-seated carriages; and consists in a novel mode of adjusting the front seat, so that it may be either used as such, or placed under the other seat when the carriage is adjusted for one seat only. The manner of attaching and supporting this seat constitutes the invention, which will be distinctly set forth in the following specification and claim.

In the annexed drawings, A indicates the body of the carriage, the form of which may, however, be modified at will, so long as the necessary support for the seats remain. B is a seat which remains constantly in position for use, though its relative position is continually changed in converting the carriage to one or two seats. When the carriage is used with a single seat, the seat B is placed as shown in Fig. 3, resting on the sides of the carriage, dowel-pins B′ being attached to the seat to hold it in position. The seat is attached to the body by two hinges, C C, pivoted to the former, and also to a bracket or leaf bolted to the body in such manner that the dowel-pins may be lifted out of their recesses and the seat moved back, swinging on the hinge-straps until it rests on the rear end of the frame, as shown in Fig. 2. A similarly oscillating seat, D, is attached by similarly hinged straps E E to the body of the carriage in such manner that when the seat B is swung back it may be replaced by the seat D. Curved legs F are attached by pivots to the bottom of seat D, and so formed that when the seat D is raised the ends of the legs may be swung outward and rested on the body of the carriage in the recesses formed to receive the front dowel-pins of seat B. Arm or side pieces G G are also hinged to the seat D, near each end, so arranged that they may be raised, as shown in Fig. 4, or folded upon the bottom of the seat, as indicated by the dotted lines in the same figure.

To convert the carriage into a double seated vehicle, the seat B is turned back, and the seat D raised until its legs F F rest on the seat-rail. When it is to be changed to a single-seated vehicle, the seat D must be raised until the ends of the legs F F are disengaged from the recesses in the seat-rail, and then the legs turned toward one another, and the seat swung down upon the floor, as shown in Fig. 3, resting on the legs and straps E. Then the seat B should be swung forward so as to rest on the body in the middle thereof and over the seat D, which will be concealed and protected by it.

I am aware that there are many carriages in use similarly convertible into single or double seated vehicles, and I, therefore, claim nothing as new beyond the device adopted by me for the purpose of effecting the conversion.

What I claim as my invention, and desire to secure by Letters Patent, is—

The seat D, to oscillate upon the hinged straps E, and supported either on the side of the body or on the bottom, by the horizontally-adjustable legs F F, substantially as set forth.

In testimony whereof I have signed my name to this specification in the presence of two subscribing witnesses.

HENRY W. QUIN.

Witnesses:
JAMES BAIN,
H. W. WHITE.